US007376860B2

(12) United States Patent
Jia et al.

(10) Patent No.: US 7,376,860 B2
(45) Date of Patent: May 20, 2008

(54) CHECKPOINT/RESUME/RESTART SAFE METHODS IN A DATA PROCESSING SYSTEM TO ESTABLISH, TO RESTORE AND TO RELEASE SHARED MEMORY REGIONS

(75) Inventors: Bin Jia, Poughkeepsie, NY (US); Ellick C. Law, Woodstock, NY (US); Richard R. Treumann, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 11/013,642

(22) Filed: Dec. 16, 2004

(65) Prior Publication Data
US 2006/0143512 A1   Jun. 29, 2006

(51) Int. Cl.
*G06F 11/00* (2006.01)
(52) U.S. Cl. .......................................................... 714/5
(58) Field of Classification Search ................ 714/5, 714/15, 16, 21, 6, 13, 20; 709/105, 106
See application file for complete search history.

(56) References Cited

U.S. PATENT DOCUMENTS

| | | | | |
|---|---|---|---|---|
| 5,864,657 A | * | 1/1999 | Stiffler | 714/15 |
| 6,477,663 B1 | * | 11/2002 | Laranjeira et al. | 714/11 |
| 6,622,261 B1 | * | 9/2003 | Laranjeira et al. | 714/11 |
| 6,708,288 B1 | * | 3/2004 | Ziegler et al. | 714/15 |
| 7,165,186 B1 | * | 1/2007 | Viswanatham et al. | 714/1 |
| 7,206,964 B2 | * | 4/2007 | Moser et al. | 714/13 |
| 2002/0138704 A1 | * | 9/2002 | Hiser et al. | 711/162 |

* cited by examiner

*Primary Examiner*—Nadeem Iqbal
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

A method is provided in which checkpointing operations are carried out in data processing systems running multiple processes which employ shared memory in a manner which preserves data coherence and integrity but which places no timing restrictions or constraints which require coordination of checkpointing operations. Data structures within local process memory and within shared memory provide the checkpoint operation with application level information concerning shared memory resources specific to at least two processes being checkpointed. Methods are provided for establishing, restoring and releasing shared memory regions that are accessed by multiple cooperating processes.

16 Claims, 6 Drawing Sheets

CHECKPOINT/RESUME/RESTART SAFE METHODS IN A DATA PROCESSING SYSTEM TO ESTABLISH, TO RESTORE AND TO RELEASE SHARED MEMORY REGIONS

BACKGROUND OF THE INVENTION

The present invention is generally directed to checkpoint and restart of cooperating processes employed in multinode data processing systems. More particularly the present invention is directed to such systems in which shared memory is present, between or among several processes, but which is not persistent and is saved as needed during checkpoint operations in nonvolatile storage systems, such as disk memory. Even more particularly, the present invention is directed to methods for the establishment, restoration and release of shared memory regions that are accessed by multiple cooperating processes.

In checkpoint operations, all processes (or threads) are stopped and held in a stable state so that the operational states are captured in a set of files which may be later read and used to restore the same stable state as part of a application restart operation. The state information includes the contents of process stack, heap, registers and other resources "owned by" the process. Once a checkpoint or restart operation is completed, control is returned to all threads or processes which then resume execution beginning at their next instruction, whatever that may be. It is assumed that threads and processes find all of the memory and other resources looking just as they were at the time they were checkpointed. Resumption of execution is a minor issue as long as the checkpoint operation itself has not needed to undo some parts of the application state. However, the restarting of operations is more complex and is particularly considered with respect to the invention disclosed herein. Accordingly, in the discussions herein, references to taking a "checkpoint" implies that a checkpoint operation has been carried out and has generated information with the needed coherence for later use in a restart operation.

Checkpoint and restart capabilities in a data processing system, particularly a multinode data processing system, provide fault tolerance and system preemption mechanisms. Certain forms of process migration are also implemented with the help of checkpoint and restart operations. These make checkpoint and restart features very appealing to large scale parallel processing applications. A parallel job is any set of processes that work together or communicate with one another for the purpose of achieving a common goal. To checkpoint a parallel job, not only does one have to save the private states of all participating processes but one must also save the shared resources and the relationships among the processes. Shared memory is one of the shared resources that should be handled very carefully in checkpoint and restart operations.

Checkpoint and restart features are typically implemented at the operating system level and higher. Operating systems, such as AIX (marketed and distributed by the assignee of the present invention) and other UNIX based systems are oriented to the handling of processes. However, in the case of multiple processes that work cooperatively and use shared memory resources, information about such cooperation is unavailable at the operating system level. One of the fundamental problems with shared resources, such as shared memory, is that it does not have a single owner. Additionally, it is very desirable that the above-mentioned system level checkpoint and restart operations be transparent to user level applications. In the typical large data processing system, most of the resources are accessible to the operating system kernel; and the system kernel maintains control of all running processes. Therefore, there are very few restrictions on when and how checkpoint can be taken. As a result of the fact that checkpoints can occur at unpredictable times, the possibility that a system hangup occurs is exists. In terms of the checkpointing of parallel jobs that store information in the shared memory regions, the operating system kernel can easily freeze the participating processes of the parallel job and save the entire shared memory region. However, a problem here is that the operating system does not know when these shared resources will be at a stable state since this information is only available at the application level. This adds a level of difficulty to checkpointing operations. Typically, only the application itself has the exact knowledge on what state and resource should be saved in order to reconstruct the process later. At the system level there is no knowledge of desired or necessary application level resources.

Nevertheless, AIX and other operating systems provide certain mechanisms which can be used to solve these problems. In particular, AIX employs a defined data structure called a mutex which is a locking mechanism which is useful in providing data integrity and coherency. It is described more particularly below in the context of its use in the present invention. Operating systems also typically provide mechanisms called handlers which are essentially subroutines or functions that are invoked upon the occurrence of a defined event. Handlers are registered with the operating system and provide application level programming with an extremely flexible method of handling certain events, such as a checkpointing operation. It is also worth mentioning here that for AIX, and for other UNIX-like operating systems, the word "process" is a term of art that refers to the execution of a program.

In prior approaches the operating system handles resources that are germane to a single process but cannot handle resources that transcend a single process. The operating system can provide hooks in the form of checkpoint, restart and resume handler invocations at the appropriate moments, but the application level must use those hooks. The present invention provides a mechanism to do so safely in the case of shared memory across multiple cooperating processes. Specifically, there exists a mechanism which allows a process at the application level process to handle resources that transcend a single process. Application level programming registers checkpoint and restart handlers and/ or callback functions for this purpose. The current AIX operating system checkpoint facility provides hooks (that is, well defined interface mechanisms) for registering these handlers. When a checkpoint operation is requested, the registered application checkpoint handlers or the callback functions run first to take care of checkpointing those resources before the system kernel starts its checkpointing process. During the restart, the system kernel operations are performed first and then the restart handlers finish application level restoration before the operating system allows the process to continue. Since the shared memory regions are shared among participating processes, the checkpoint and restart handlers contain synchronization points among the processes for the integrity of the content of the shared memory regions. When there are multiple levels of shared memory usage, multiple checkpoint/restart handlers are run in a specific order. Some data processing operating systems (Silicon Graphics, Inc.'s IRIX operating system, for example) use a first-in-first-out (FIFO) order for such handlers while others (International Business Machine's AIX with Parallel Environment for AIX, for example) employ a first-in-last-out order (FILO) for these handlers. For instance, a parallel job on a data processing system exploits a shared memory segment for communication. Participating processes register the handlers at beginning of the job. Once the handlers are registered, a checkpoint is allowed to proceed and the data structures in the shared memory segment necessary for restart are saved by the handlers during the checkpoint operation. Note that if the checkpoint operation is requested while some process has not registered its handlers, and the active handlers expect that process, which has not yet registered a handler to participate, then the synchronization among the checkpoint handlers can never complete, thus resulting in a hung process. Thus, in prior systems, if checkpointing of a parallel job using parallel shared resources is attempted before the needed checkpoint and restart handlers are registered, then deadlocks may happen. Accordingly, insuring that exactly those processes which have registered their handlers are expected to participate in the synchronization process is an important step.

Restrictions on when checkpoint operations can be undertaken are not acceptable in certain circumstances, especially when dynamic tasking and third party libraries are used. (See below for a more complete description of these terms.) For example, consider an application that does not create shared memory regions directly but uses the IBM MPI (Message Passing Interface) or LAPI (Low level Application Programming Interface) libraries. Quite often, these communication libraries make use of shared memory within one data processing node for better performance. The application may not be aware of shared memory usage employed on its behalf. In order to be checkpoint/restart safe, communication libraries should register checkpoint and restart handlers for handling of the shared memory regions during initialization. The problem is that the communication libraries may be initialized at different times by different processes. Therefore, it is possible that some processes may perform a lot of computation before communicating with other processes. Not allowing a checkpoint operation before the initialization of all communicating processes means these computation results can not be checkpointed.

Normally, tasks of a parallel job and their relationships are determined statically at the job startup time and do not change until the end of the job. However, MPI (Message Passing Interface) allows dynamic task creation and termination after a job has started. Accordingly, the group of tasks of the job can change and the group of tasks sharing a shared memory resource can also dynamically change as a result. With respect to third party libraries these are libraries that are not part of the operating system but are not part of the user application either. MPI is commonly implemented as a third party library.

In the present invention, there is provided methods to establish, to restore and to release shared memory regions so that the use of application level handlers is sufficient without imposing unnecessary restrictions on when checkpoint operations can be undertaken. The description of the present invention and its methods is based on the implementation of the shared memory communication operation in the MPI (Message Passing Interface) library on the IBM AIX operating system and within the IBM Parallel Environment for AIX. However, it is noted that this particular platform is used as a mechanism for better explaining the concepts of the invention and also to describe the embodiment preferred by the inventors; however, it should be fully appreciated that the use and operation of the present invention is applicable to any shared memory data processing system running processes in parallel or simultaneously. The AIX/PE platform supports registration of application level checkpoint/ restart handlers. Users are able to register three different sets of handlers: checkpoint, resume and restart in the application code. Checkpoint handlers run during checkpoint operations. Either the resume or restart handlers run after checkpoint is completed, depending on whether the job is to continue or is being restarted. The AIX operating system (made and sold by the assignee of the present invention) also provides a mechanism for a process to block checkpointing operations. Checkpointing of a process only occurs when no thread of that process is holding a "Pthread mutex" lock ("mutex" for short; see below for an explanation of the meaning and operation of a mutex lock). Checkpoint blocking is used to protect critical sections of application level code. (In the present context, a critical section of code is one whose operations must be allowed to complete atomically in order to insure data integrity and/or data coherence.) Various blocking mechanisms are provided by different systems. In some cases, it is done by simply masking/unmasking the checkpoint signal. The blocking of checkpointing for a thread within a critical section would not be not required in a system in which "resume" or "restart" functionality provides an assurance that threads in a critical section at checkpoint time will resume or restart still holding whatever lock they held before the checkpoint operation began. The present invention also employs a blocking mechanism but it is noted that the specific nature of the blocking mechanism is not at all critical.

To checkpoint or restart a parallel job, which can be any set of processes working together or communicating with one another for a common goal, a framework is desired to coordinate the activities involved in the checkpoint or in the restart process. This framework is typically provided above the level of the operating system facilities that support single process checkpoint and restart operations. Within this framework, checkpoint signals are delivered to all participating processes, checkpoint file sets are gathered and packaged, and processes are restarted with the checkpoint file sets. The simplest form of the framework is just a set of directions and rules that users follow so that the parallel job is able to be correctly restarted. In the present implementation, the framework is the IBM PE (Parallel Environment) for AIX platform, as mentioned above, which automates signal delivery and checkpoint file set management. However, the present methods to establish, to restore and to release shared memory regions apply to any such framework thus allowing user level shared memory checkpoint and restart operations to be carried out, without any timing restriction, both coherently and correctly.

SUMMARY OF THE INVENTION

In accordance with a preferred embodiment of the present invention a mechanism and a method is employed for supporting system level checkpoint operations in a data processing system by providing data structures within local process memory and within shared memory which provide application level checkpoint handlers with application level information concerning system resources specific to the process being checkpointed. Accordingly, the present invention is directed not just to specific methods but also to the data structures employed for communication and interface purposes between application level programs and operating system level code that are employed to carry out these methods. These data structure are found both in local process memory and in shared memory. These data structures provide a bookkeeping function to keep track of an important set of parameters used in support of checkpoint operations.

More particularly, the present invention implements methods for establishing, restoring, and releasing shared memory regions and for updating the control data structures to provide coherent, deadlock free, checkpoint and correct restart operations without timing restrictions. The method of the present invention updates the control data structures in application level checkpoint and restart handlers which are registered with the operating system (which provides kernel level functionality). Furthermore, the method herein carries out application level checkpointing and restarting of shared memory regions based on the values and states of the provided data control structures.

Using the methods of the present invention, a shared memory region is safely checkpointed at the application level without any restriction on when a checkpoint can be taken and a set of checkpoint files created that are used for correct restarting of a checkpointed parallel job. Processes can attach to any shared memory region and detach from it at any time during the job, one time or repeatedly, before or after taking of a checkpoint, as needed by the application.

Accordingly, it is an object of the present invention to provide enhanced functionality for the IBM AIX Parallel Environment platform.

It is still another object of the present invention to utilize existing handler registration capabilities and to further extend these capabilities into the realm of reliable and flexible checkpoint operations.

It is yet another object of the present invention to make it possible for checkpointing operations to be employed at any time during the running of multiple cooperating processes.

It is a further object of the present invention to coordinate the use of shared memory in checkpoint operations and to allow new tasks to join in or depart from the use of the shared memory setup after the parallel process is resumed or restarted following a checkpoint.

It is also an object of the present invention to provide checkpoint methods for the reliable establishment, restart and for resumption operations in a checkpoint process in an environment of multiple cooperating processes with shared resources.

Lastly, but not limited hereto, it is an object of the present invention to manage data control structures for checkpoint operations in an efficient manner which insures coherency and consistency of data and processes which are checkpointed.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

FIG. 1 is particularly directed to the process carried out by a node leader;

FIG. 2 is particularly directed to the process carried out by a non-node leader;

DETAILED DESCRIPTION OF THE INVENTION

Figure 1:
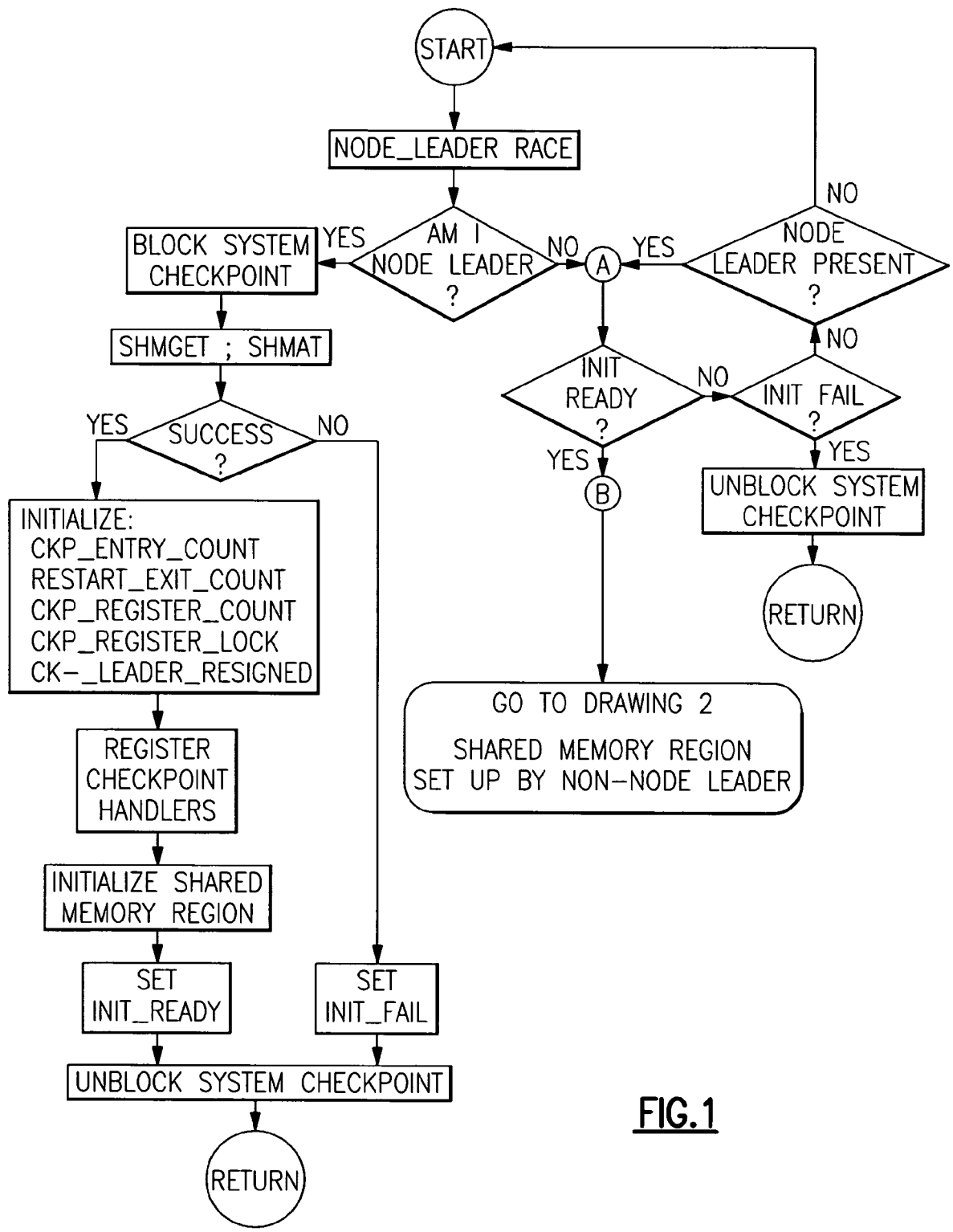
FIGS. 1 and 2 together constitute a process flow diagram which illustrates the structure of a code segment usable for establishing a shared memory region in a manner which always correctly establishes a shared memory region even in the event that it is interrupted by a checkpoint operation.

On the IBM Parallel/Message Passing Interface platform, shared memory is used for communications between parallel processes on the same data processing node. The establishment of a shared memory region is done by invoking MPI_Init ( ) in all processes and the release of the shared memory region is done by invoking MPI_Finalize ( ) in all processes. Checkpoint/restart is supported by the IBM Parallel Environment product (version 3.2), but had the restriction that checkpoint is only allowed after the completion of MPI_Init ( ) by all participating processes of the parallel job and before the start of the MPI_Finalize ( ) for any participating processes. The two invocations (MPI_Init ( ) and MPI_Finalize ( )) are required by the MPI standard, in any MPI application. Checkpoint and restart handlers for the shared memory region are registered as part of the shared memory establishment and the handlers are disabled after the release of the shared memory region. This guarantees that the synchronization in the checkpoint and restart handlers is completed successfully. As discussed above, this greatly limits the value of checkpoint/restart for the MIMD (Multiple Instruction path, Multiple Data path) types of parallel applications when processes are allowed to attach to the shared memory segment at different times. With subsequent modifications made to the IBM Parallel Environment product version 4.1 in accordance with the present invention, this restriction has been removed and the checkpoint/restart safe method to establish/restore/release shared memory regions is now fully implemented.

For purposes of best presenting and understanding the methods, principles, structure and advantages of the present invention, the discussion below is directed to the operation of the invention on only one node to establish/restore/release shared memory. However, it is noted that the present invention supports disjoint sets of participating processes that are running on multiple data processing nodes and that the decision on whether or not to use shared memory communications is a global one. That is, a job can consist of a set of processes on each one of a plurality of nodes. Shared memory checkpoint and restoration applies to each node independently. For clarity, however, it is noted that the present invention does not require the collective involvement of more than one node in a data processing system. In the embodiment of the present invention chosen to be implemented it has been decided to fall back from the use of shared memory on nodes which had succeeded in initializing it if any node had failed to initialize it. There is no implication, however, that this is always required as an optimum choice. For example, some Message Passing Interface (MPI)

collective operations require that shared memory region be established on all nodes so that special algorithms can be used to achieve better performance. In those cases, the global decision making procedure for determining whether to use shared memory is best implemented in three separate steps:

1. Shared memory establishment step: shared memory usage is initialized locally on each data processing node.
2. Internode communication step: distributing the outcome of Step 1 on each individual node to all other nodes.
3. Decision making step: processes on each data processing node use the global information to decide whether to use the shared memory segment for future operations. If the shared memory segment is not be used, because some nodes have failed the shared memory initialization step, then those processes that have successfully initialized shared memory usage release the local shared memory segment.

3.1 Control Data Structures

The present invention is implemented through the use of data structures present within local process memory and within shared memory which provide system level checkpoint processes with application level information concerning system resources specific to the process being checkpointed. These data structures are now more particularly described.

When taking a checkpoint, the following data structures are either saved in one checkpoint data file or within files that are part of the complete checkpoint file set. A complete checkpoint file set is needed for a correct and coherent restart of the checkpointed job, and should contain at least some of the following data structure items. There are two kinds of data structure control items. One kind is needed by each process and is preferably implemented as global variables for a process. The other kind is placed in the shared memory region for coordinating accesses to the region by processes sharing that region.

The following variables are employed for each process that is checkpointed by the operating system.

i_am_leader

The i_am_leader variable records whether a process is the leader of a set of processes residing on the same data processing node and are checkpointed together. The value of i_am_leader for the node leader process is TRUE and values for all other processes are FALSE. In preferred embodiments of the present invention, a node leader is responsible for:

(a) establishing shared memory region during MPI_Init ( );
(b) creating checkpoint file(s) and writing relevant content of the shared memory regions to the checkpoint file(s) in the checkpoint handler;
(c) restoring the shared memory region during the restart in the restart handler;
(d) reading relevant information from the checkpoint file(s) and reconstructing the shared memory region in the restart handler; and
(e) releasing the shared memory region during MPI_Finalize ( ).

Since a parallel job is usually more than just a collection of processes running at the same time, there usually exists a coordinator for each parallel job. With the help of the coordinator, the selection of a node leader is not difficult. In the IBM MPI implementation, the coordinator is the Parallel Operating Environment (POE) for AIX. As part of job launching, the POE ranks each process of the parallel job, hence the MPI simply chooses the process with the highest rank on a node as the node leader. However, the need for a coordinator is not essential in the present invention and there are other, well known and more general mechanisms that are usable for node leader selection. One such example is to ensure that a specific named file does not exist on the node and then let processes on the same node race on creating a file with the same name through the POSIX file system open ( ) call with the O_CREAT and the O_EXCL flags set. Only one process will succeed in creating the new file and it can assume the node leader role. To be more specific POSIX is a set of UNIX inspired operating system standards defining, in this case, the standard semantics for opening a file. It is thus referenced herein primarily for its role in providing the reader with a better understanding of standard, well known calls and functionality. When the O_CREAT flag is set the open ( ) call creates a file when it does not exist previously. When the O_EXCL flag is set the open ( ) call returns with a failure if the targeted file has already been opened by another process's open ( ) call. Hence, the combination of these two flags means that only the first caller is successful in creating the new file and opening it.

ckp_blocking_mutex

The ckp_blocking_mutex variable is used for temporarily blocking checkpoint/restart operations for the process. mutex is a UNIX based term of art that refers to a mutual exclusion. It is a data structure implemented, typically by the operating system. As implemented by AIX, when a thread "takes a mutex lock," it is the only thread that will have it. When a checkpoint operation is performed any thread not holding a valid mutex lock is stopped immediately. Other threads (those "holding a mutex") are allowed to continue until the thread reaches the point at which it releases the lock. The operating system, such as AIX, know what mutex's have been defined and are held. The term mutex is itself defined in the above-mentioned POSIX standard. The operating system functions so as to guarantee that only one thread in a process can hold a mutex at any given time. The operating system also knows how many mutex locks each thread has. Well written code uses the concept and function of a mutex lock before updating any shared memory or variables and thereafter releases the mutex lock. However, as a concept, the mutex lock is ignorant of what it is locking.

The following variables are stored in shared memory regions and are saved by the checkpoint handler during the checkpointing process.

ckp_register_count

The ckp_register_count records the number of processes that have registered the shared memory checkpoint/restart handlers and that will participate in the synchronization in the checkpoint/restart handlers.

ckp_entry_count

The ckp_entry_count records how many processes have run the checkpoint handlers after the checkpoint is requested.

restart_exit_count

The restart_exit_count records how many processes have run the restart handlers after the restart is requested.

ckp_register_lock

The ckp_register_lock protects the integrity of the control data structures in the shared memory. To update the ckp_register_count, the ckp_register_lock must be held. In preferred embodiments of the present invention, a value of 0 for this variable represents that the state is locked and a value of 1 means that it is unlocked. Well known methods are employed which allow a process to set a lock variable to "0", thus claiming the lock, only if it is not currently "1," meaning that the lock is held by another process. The selection of "0" and "1" is not exactly an arbitrary choice in this particular situation. The present choice is based on the way that shared memory is implemented in the AIX operating system. When new shared memory is acquired, AIX initializes the new memory locations by placing 0's in the them. Therefore, the choice of "0" also works as a effective block for all other processes preventing them from proceeding until the node leader has completed all the required shared memory set up processes and resets this lock value to 1.

ckp_leader_resigned

When the node leader is exiting it notifies the other processes by setting this flag. In a subsequent checkpoint event, the checkpoint handlers of other processes elect a new node leader.

In order for this method to be applied to the general cases of using shared memory there are three files that are needed. These files are stored on the local file system. If these exist at the time of checkpoint, they become part of the checkpoint file set that is made available during restart.

ckp_node_leader file

For the case when an outside coordinator is not available, this file is used in the race to select a node leader. Each process tries to open this file with the O_CREAT and O_EXCL flags. If the open succeeds, the process becomes the node leader. The file is local to the node, not on a shared file system seen by other nodes.

init_ready (init_failed) file

The node leader creates this file once it has completed the initialization of the shared memory region. The file is local to the node, not on a shared files system seen by other nodes.

ckp_lock file

This file is used to replace the ckp_register_lock variable in the shared memory region. Racing on opening this file, with O_CREAT and O_EXCL flags, provides a general approach for protecting other data structures in the shared memory region. The file is local to the node, not on a shared file system seen by other nodes.

3.2 Methods to Establish and Release the Shared Memory Region

As discussed above, in the MPI implementation of the present invention, the Parallel Operating Environment assigns a task ID to each process and records in the process environment how many processes are on the node and the rank of the process. Each process is able to read its list and to determine if its own rank is equal to the highest rank on a node and hence is to be designated as the node leader. In other implementations, as described above, a more general approach, such as the creation of the ckp_node_leader file, is used to select the node leader which then becomes responsible for shared memory establishment and release.

It is noted that checkpoint signals are not assumed to be synchronized in any way with the underlying processes. Different processes are typically at different stages of execution. Nonetheless, checkpointing operations must not negatively impact data coherency or integrity between or among cooperating processes employing shared memory.

As indicated above, use of the Message Passing Interface requires an initial invocation of the MPI_Init ( ) call. When the MPI_Init ( ) call is made on it, the node leader creates the shared memory region by calling shmget( ) (a standard and well known shared memory get operation) and then attaches to the shared memory region. The node leader then initializes the control data structures in the shared memory region, including setting the ckp_register_count to 1, thus indicating that it has joined the collective. The node leader also registers its checkpoint handler(s) and its restart handler (s) at this time. All of these registrations must be done atomically relative to the checkpoint operation, so the local ckp_blocking_mutex is locked first so as to temporarily block the checkpoint operation and then unlocked once the initialization is done.

In the present invention, as a way of notifying other processes, the node leader sends the outcome (success or failure) of its initialization, through a non-shared memory communication subsystem that is previously established among all the processes, to all other processes of the node once the leader's initialization is done. Non-leader processes wait in their own MPI_Init calls for this result before performing their own shared memory establishment work. This communication is semantically an MPI_Bcast among the tasks on the node with node leader as broadcast root. This approach is chosen for simplicity. For systems that do not have the broadcast support, the notification and synchronization can be carried out in other, more general ways. For instance, if its initialization is successful, the node leader creates a file named init_ready. Otherwise it creates a file named init_failed. The other processes wait for either of the files to be created before continuing with the establishment of shared memory in the init_ready case or foregoing the establishment in the init_failed case as described below. This is file based coordination is semantically equivalent to the node leader broadcasting the outcome to all non-leaders on the node.

If the broadcast result is positive or if the init_ready file is found, a non-node leader process in its MPI_Init ( ) call first locks its local ckp_blocking_mutex to block checkpointing and then calls shmget/shmat (shared memory get and shared memory attach operations) to attach to the shared memory region, using the same shared memory key value as that of the node leader. After successfully attached to the shared memory region, the process then tries to get the ckp_register_lock. If the process is again successful, it increments the ckp_register_count by 1, registers its checkpoint/restart handler and unlocks the ckp_register_lock. This process is carried out atomically with respect to the checkpoint operation, in that the local ckp_blocking_mutex is locked before the shmget/shmat invocation and is unlocked when done.

If the shmget (shared memory get operation) fails on a non-leader node because no shared memory region is found, one possible reason is that there is a checkpoint or a restart in progress which has blocked the node leader ahead of its shared memory initialization step. To handle that scenario, the process unlocks the ckp_blocking_mutex so as to allow a checkpoint on itself and then to start the shared memory procedure over again. Another possible reason (which does not apply to the IBM MPI implementation discussed above) for shmget failure is that all processes that previously attached to the shared memory have already detached from the shared memory region. Since the node leader also released the shared memory, a new node leader needs to be elected. This can be done by double checking for the existence of the init_ready file and reentering the node leader race if init_ready no longer exists. The file init_ready could be removed as part of the shared memory release step of the previous node leader. This process is guaranteed to register the checkpoint and restart handlers and to bump the ckp_register_count in the shared memory region.

Locking the ckp_register_lock could also fail, either because the node leader locks newly arrived processes out of shared memory during a checkpoint, or some other non-node leader process is updating the ckp_register_count. When a process fails to lock the ckp_register_lock, it unlocks the ckp_blocking_mutex, exposing itself to a possibly pending checkpoint. The process which has failed to gain the ckp_register_lock retries the cycle of: "take checkpoint blocking mutex lock (ckp_blocking_lock); try for checkpoint register_lock (ckp_register_lock,); update checkpoint register count (ckp_register_count) if successful; else release checkpoint blocking mutex lock (ckp_blocking_lock) and retry" as many times as needed.

Figure 2:
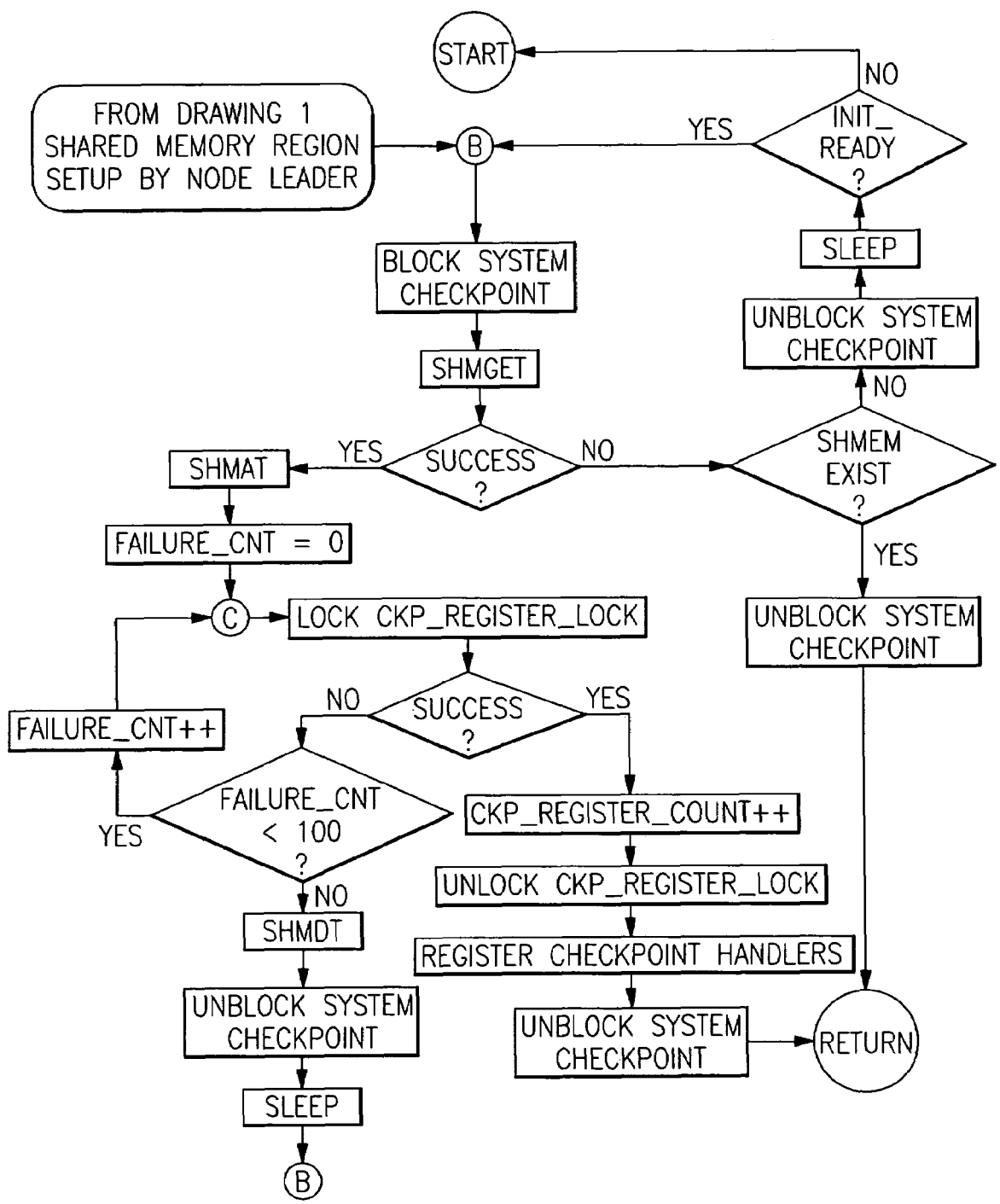

Pseudocode, using grammatical structures from the C programming language, for establishing shared memory region using the generalized method is presented below and is also shown in FIGS. 1 and 2:

```
START: node leader race on opening ckp_node_leader
       and winner set i_am_leader to TRUE
if (i_am_leader == TRUE) {
    lock ckp_blocking_mutex
    shmget (key, size, flag)
    shmat
    if (success) {
        ckp_entry_count = 0
        restart_exit_count = 0
        ckp_register_count = 1
        ckp_register_lock = 1
        ckp_leader_resigned = 0
        register checkpoint and restart handlers
        perform other shared memory initializations
        create file init_ready
    } else {
        create file init_failed
    }
    unlock ckp_blocking_mutex
    return
} else {
A:  check the existence of init_ready or init_failed
    if (neither init_ready nor init_failed exists) {
        if (ckp_node_leader no longer exists)
            goto START
        else
            goto A
    }
    if (init_ready found) {
B:  lock ckp_blocking_mutex
    shmget (key, 0, 0)
    if (success) {
        shmat
        failure_cnt = 0
C:      try to lock ckp_register_lock
        if (failed) {
            if (failure_cnt < 100) {
                failure_cnt ++
                goto C
            } else {
                shmdt
                unlock ckp_blocking_mutex
                sleep a while
                goto B
            }
        } else {
            ckp_register_count++
            unlock ckp_register_lock
            register checkpoint/restart handlers
        }
    } else if (no shared memory region exist) {
        unlock ckp_blocking_mutex
        sleep a while
        if (init_ready no longer exists)
            goto START
        else goto B
    }
}
/* NOTE: if (init_failed found) execution will skip to this point
and it will be a no-op. */
unlock ckp_blocking_mutex
return
}
```

In preferred embodiments of the present invention, release of the shared memory region occurs via a MPI_Finalize( ) call which every process using the Message Passing Interface is required to use. A process tries to lock the ckp_register_lock before decrementing the ckp_register_count and deregisters its checkpoint and restart handlers. If failed, the steps are retried. Otherwise, the process decrements the ckp_register_count and deregisters the handlers. All of these operations are carried out while holding the ckp_blocking_mutex. In the implementation of the present invention, since all participating processes concurrently release shared memory region via a MPI_Finalize( ) call, the node leader simply loops on checking the value of ckp_register_count and exits when ckp_register_count reaches 0.

In the more general cases, the node leader cannot simply wait but must release the shared memory region regardless the progress of other processes. Since checkpointing is possible after the node leader releases the shared memory region, a mechanism is needed for picking new node leader and for assuming the responsibility for future checkpointing operations. This can be done by the node leader setting the ckp_leader_resigned flag in the shared memory region. If there are other processes still attaching to the shared memory region, then one of them will assume the node leader role during the next checkpoint event. If all processes released the shared memory region, the last one to release it removes the ckp_node_leader and init_ready files so as to allow new node leader race. When that happens, the ckp_register_lock is not released so that all processes that have not registered their checkpoint and restart handlers, but which have already passed the node leader race stage, are locked out of the shared memory region until a new node leader restores the shared memory region to a stable state.

Figure 3:
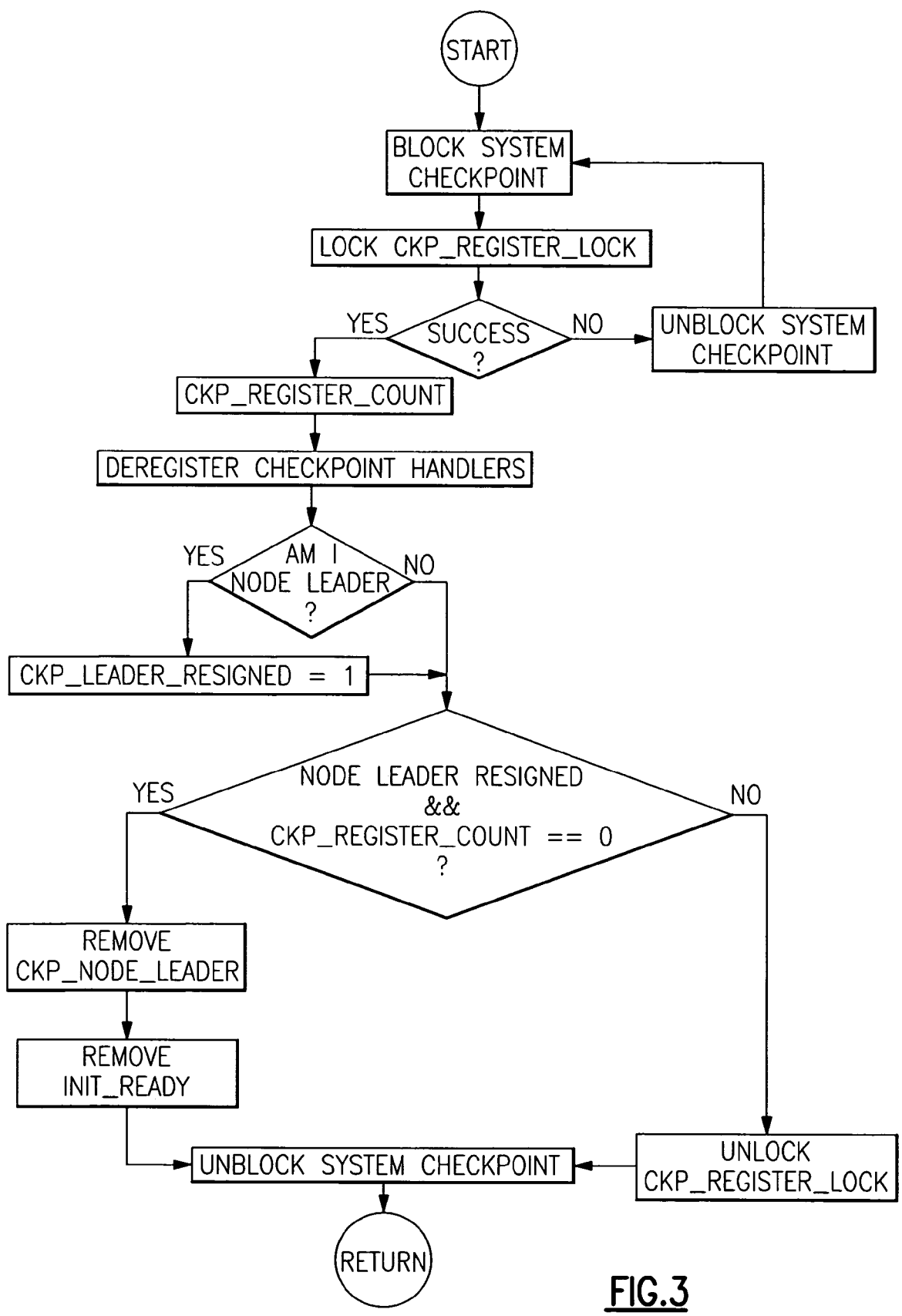
FIG. 3 is a process flow diagram describing a code segment for releasing a shared memory region in a manner in which process flow functions correctly even when interrupted by a checkpoint operation.

The pseudo code, again using grammatical structures from the C programming language, for releasing shared memory region is provided below and is also shown in FIG. 3:

```
D: lock ckp_blocking_mutex
   try to lock ckp_register_lock
   if (success) {
       ckp_register_count--
       deregister the checkpoint/restart handlers
       if (i_am_leader == TRUE) {
           ckp_leader_resigned = 1
       }
       if (ckp_leader_resigned == 1 && if
       (ckp_register_count == 0) {
           remove ckp_node_leader
           remove init_ready
       } else {
           unlock ckp_register_lock
       }
       unlock ckp_blocking_mutex
   } else {
       unlock ckp_blocking_mutex
```

```
        goto D
}
```

3.3 Method to Checkpoint/Restart Shared Memory Regions

Checkpoint Handler

In the checkpoint handler, every process increments the value of ckp_entry_count. The node leader checks this value to make sure that all previously registered processes have entered a checkpointing operation. Once all processes have entered a checkpointing operation, the node leader saves the relevant data structures in the shared memory region to the checkpoint file and then resets the value of ckp_entry_count to 0. All other registered processes wait for the ckp_entry_count to change to 0 before exiting the checkpoint handler. This synchronization is guaranteed to complete since the node leader locks ckp_register_lock first and holds the lock during the entire checkpointing procedure. Therefore a process either has registered the checkpoint/restart handlers or is locked out. Those processes which have not yet registered (that is, joined the segment and registered their checkpoint and restart handlers) have no stake in checkpointing the shared memory so the node leader only waits for those which have joined the shared memory and is counted by the ckp_entry_count.

In the general case, it is possible that the node leader has resigned before the checkpoint event and will not participate in checkpoint synchronization. One process takes over the node leader's responsibility in that case. The non-node leader process determines if it is the first to enter the checkpoint operation. This is done by checking the value of ckp_entry_count, which is done atomically with its update on the value. The first entered, non-node leader process then checks the ckp_leader_resigned flag. If that flag is set, this process tries to lock ckp_register_lock before clearing the ckp_leader_resigned flag and setting the value of i_am_leader to TRUE. Note that ckp_register_lock can be locked since it is not to be held by the node leader forever and hence there is a need to double check the ckp_leader_resigned flag after locking ckp_register_lock to eliminate any race condition.

Figure 4:
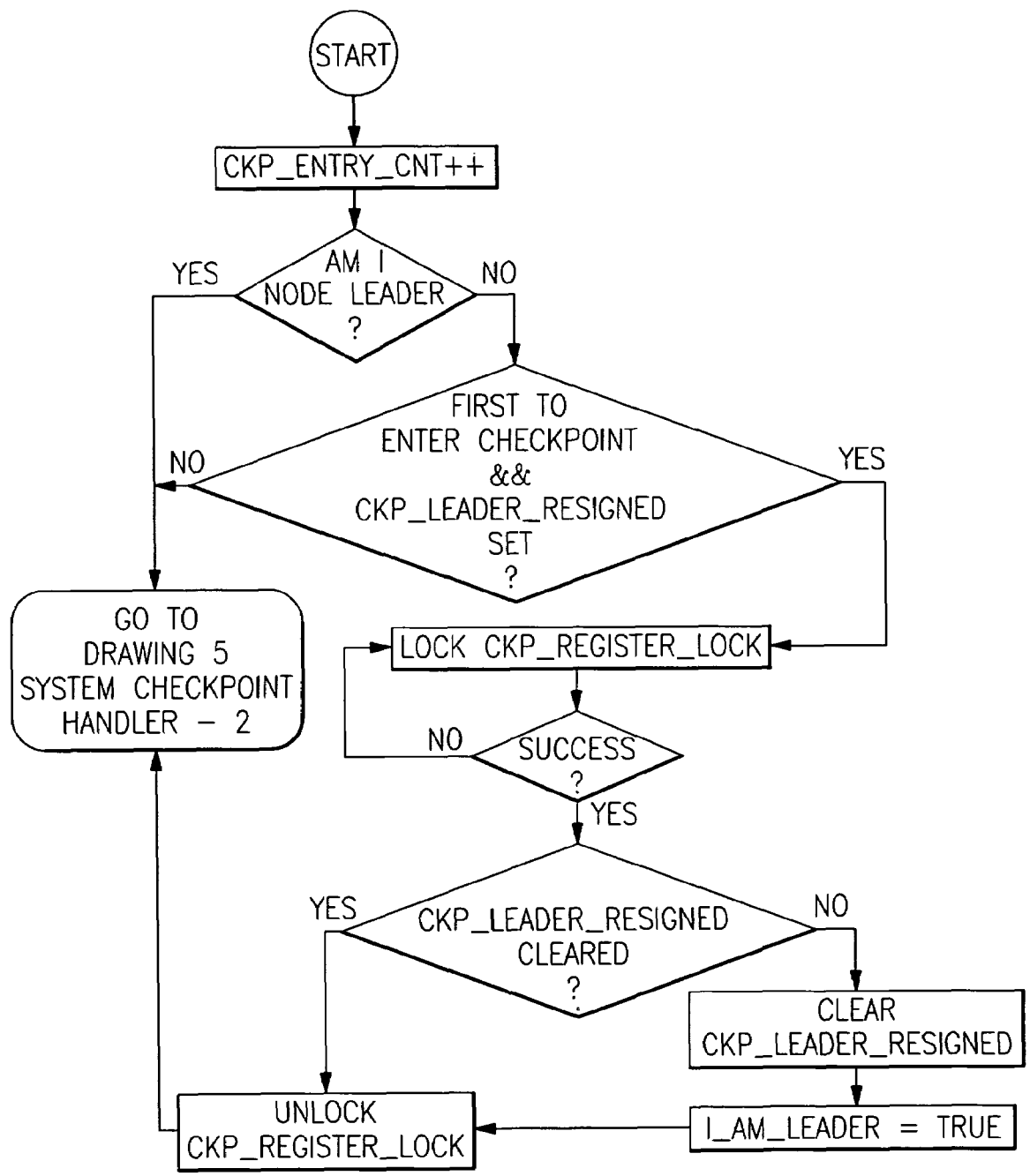
FIGS. 4 and 5 together constitute a single process flow diagram which illustrates the structure of a code segment usable for checkpoint handling.
Figure 5:
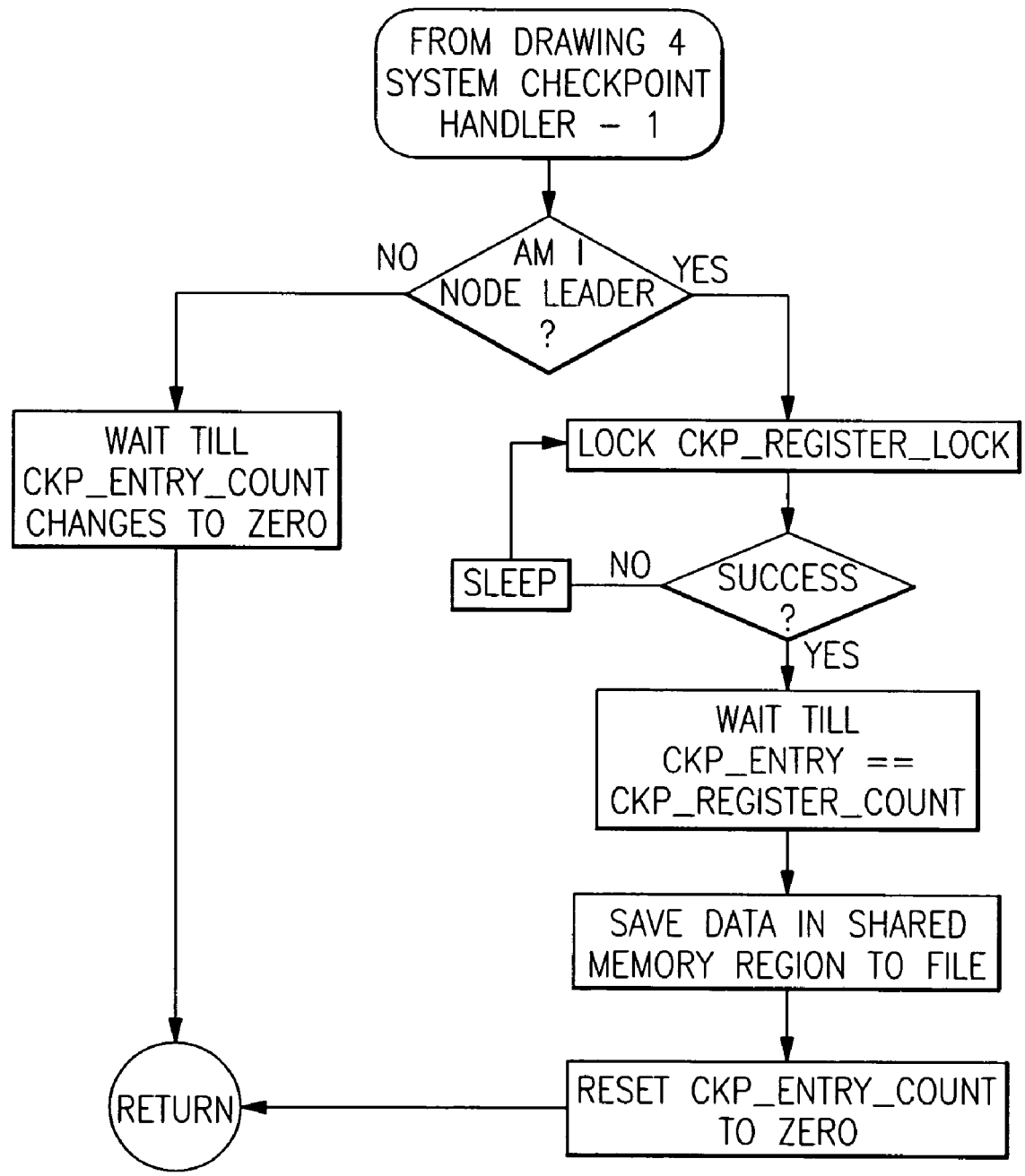

The pseudocode, again using grammatical structures from the C programming language, for the checkpoint handler is provided below and is also shown in FIGS. 4 and 5:

```
increment the ckp_entry_count
if (i_am_leader != TRUE) {
    if (this process is the first to enter checkpoint &&
    ckp_leader_resigned is set) {
        try to lock ckp_register_lock
        if (failed) retry
        if (ckp_leader_resigned is still not cleared) {
            clear ckp_leader_resigned
            i_am_leader = TRUE
        }
        unlock ckp_register_lock
    }
}
if (i_am_leader == TRUE) {
    try to lock ckp_register_lock
    if (failed) sleep for a while and retry
    wait till the value of ckp_entry_count reaches ckp_register_count
    save the relevant data structures in the shared memory region
        to the checkpoint file
    reset ckp_entry_count value to 0 for the possibly next checkpoint
```

```
} else {
    wait till ckp_entry_count changes to 0
}
```

Resume Handler

In the resume handler, which is called when a checkpointed MPI job resumes operation from a state that is still intact in system memory, the local node leader unlocks the ckp_register_lock to unblock processes from establishing/releasing shared memory region. Nothing else is needed.

The pseudo code, again using grammatical structures from the C programming language, for the resume handler is provided below:

```
if (i_am_leader == TRUE)
    unlock ckp_register_lock
```

Restart Handler

Before the Restart handler is called by the system restart facility, the entire state associated with the process in itself is restored by operating system provided restart logic. In the restart handler, the node leader is responsible for restoring the shared memory region and for reconstructing relevant data structures in the shared memory region based on the checkpoint file. Once the restoration is done, the node leader unlocks the ckp_register_lock. This allows processes that have not registered their checkpoint/restart handlers to continue and also to notify other processes in restart to exit restart handlers. Once a non-node leader process has entered its restart handler and finds that the ckp_register_lock is unlocked, it increments the restart_exit_count. When they are all done, the node leader resets restart_exit_count to 0 and also exits the restart handler.

Figure 6:
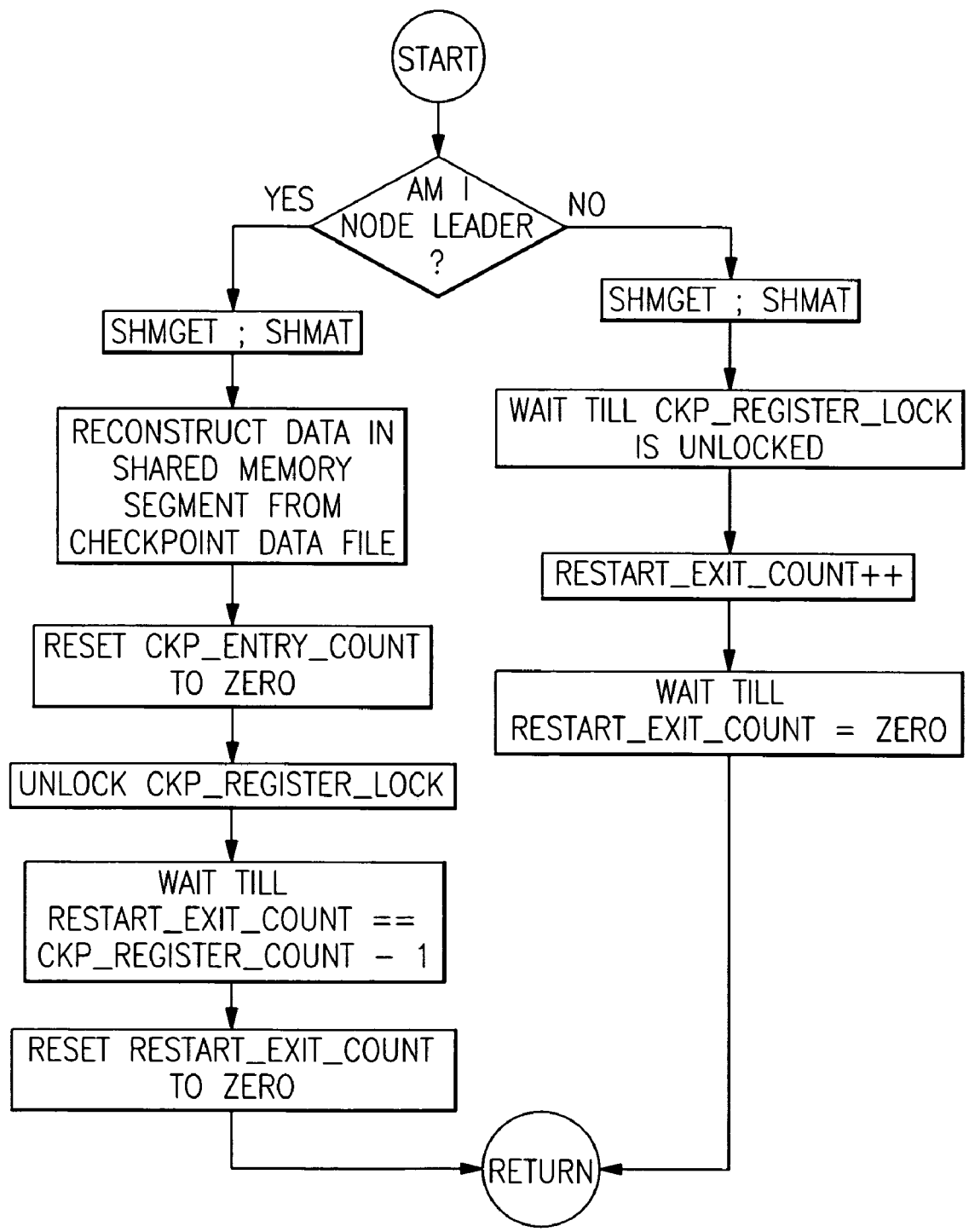
FIG. 6 is a process flow diagram describing a code segment for a restart handler.

The pseudo code, again using grammatical structures from the C programming language, for the restart handler is provided below and is also shown in FIG. 6:

```
if (i_am_leader == TRUE) {
    shmget and shmat to restore shared memory region
    reconstruct the data structures in the shared memory data from
        the checkpoint file
    reset ckp_entry_count value to 0 since the value restored from
        the file is not 0
    unlock ckp_register_lock
    wait till the restart_exit_count equals ckp_register_count − 1
    reset restart_exit_count to 0
} else {
    shmget and shmat
    wait till ckp_register_lock is unlocked
    increment restart_exit_count by 1
    wait until the value of restart_exit_count is zero before exit
}
```

The above methods have one dependency on AIX's implementation of shared memory creation. In particular, AIX guarantees that a newly created shared memory region contains nothing but 0. The integrity of the ckp_register_lock relies on that. Simplicity is the reason why the present implementation and description of the methods choose to use ckp_register_lock. A more general approach that does not have the same dependency on AIX is to use racing on opening the ckp_lock file as way of locking and unlocking.

A process trying to obtain the lock should invoke a POSIX open call on the file using the O_CREAT and the O_EXCL flags described above. The lock is obtained when the call succeeds. Releasing the lock is implemented simply by the process that holds the lock removing the file.

In the description of the present invention as presented above, several instances are discussed in which a counter is either decremented or incremented. It is noted that process steps such as decrementing and incrementing, in their most general embodiment, does not have to be a change by "1" each time. The important aspect of these processes is that they are monotonic in accordance with an established ordering scheme together with the ability to determine that an end point in the order has been reached. Typically, and preferably, this is accomplished with integer arithmetic operations, but it need not be so in the most general implementations of the present invention.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for supporting system level checkpoint operations in a data processing system by providing data structures within local process memory and within shared memory which provide application level handlers invoked by system level checkpoint operations with application level information concerning shared memory resources specific to at least two processes being checkpointed.

2. The method of claim 1 in which an application registers handlers for checkpointing which are invoked at the system level.

3. The method of claim 1 in which there are a plurality of processes that are checkpointed.

4. The method of claim 1 in which said data structure provides support for establishing shared memory regions for said processes.

5. The method of claim 1 in which said data structure provides support for restoring shared memory regions for said processes.

6. The method of claim 1 in which said data structure provides support for releasing shared memory regions for said processes.

7. The method of claim 1 in which said data structure includes indicia of whether or not a process is the leader of a set of cooperating processes.

8. The method of claim 1 in which said data structure includes lock information for temporarily blocking checkpoint and restart operations for the process.

9. The method of claim 1 in which said data structure includes indicia which indicates the number of processes that have registered the shared memory checkpoint and restart handlers that participate in checkpoint synchronization.

10. The method of claim 1 in which said data structure includes an indicia which indicates how many processes have run the checkpoint handlers after the checkpoint is requested.

11. The method of claim 1 in which said data structure includes an indicia which indicates how many processes have run the restart handlers after the restart is requested.

12. The method of claim 1 in which said data structure includes a checkpoint register lock.

13. The method of claim 1 in which said data structure includes an indicia which indicates that a node leader has resigned.

14. A method for establishing a shared memory region having checkpoint capabilities, said method comprising the steps of:
    creating a shared memory region for at least two processes;
    initializing control data structures within said shared memory region, including initializing a checkpoint register count to indicate that said processes are capable of accessing shared memory; and
    registering at least one checkpoint handler and at least one restart handler.

15. The method of claim 14 further including the step by a node leader of sending the result of said initializing step, through a non-shared memory communication system that is established among all of the processes, to all other processes.

16. The method of claim 15 further including a step in which non-node leader processes wait for the result of said initializing step before performing establishing their own shared memory data structures.

* * * * *